United States Patent
Chendamarai Kannan et al.

(10) Patent No.: US 11,588,529 B2
(45) Date of Patent: *Feb. 21, 2023

(54) BEAM MANAGEMENT ENHANCEMENTS FOR MMWAVE OPERATIONS

(71) Applicant: QUALCOMM Incorporated, San Diego, CA (US)

(72) Inventors: Arumugam Chendamarai Kannan, San Diego, CA (US); Makesh Pravin John Wilson, San Diego, CA (US); Jung Ho Ryu, Fort Lee, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/193,926

(22) Filed: Mar. 5, 2021

(65) Prior Publication Data

US 2021/0194553 A1 Jun. 24, 2021

Related U.S. Application Data

(63) Continuation of application No. 16/670,804, filed on Oct. 31, 2019, now Pat. No. 10,958,328.
(Continued)

(51) Int. Cl.
*H04B 7/06* (2006.01)
*H04L 5/00* (2006.01)

(52) U.S. Cl.
CPC ........... *H04B 7/063* (2013.01); *H04L 5/0007* (2013.01); *H04L 5/0057* (2013.01)

(58) Field of Classification Search
CPC .... H04B 7/0617; H04B 7/063; H04B 7/0634; H04L 5/0007; H04L 5/0057
(Continued)

(56) References Cited

U.S. PATENT DOCUMENTS

2007/0099578 A1 5/2007 Adeney et al.
2013/0072243 A1 3/2013 Yu et al.
(Continued)

FOREIGN PATENT DOCUMENTS

CN 107113654 A 8/2017
CN 107241129 A 10/2017
(Continued)

OTHER PUBLICATIONS

International Search Report and Written Opinion—PCT/US2019/059529—ISA/EPO—dated Mar. 25, 2020 (190356WO).
(Continued)

*Primary Examiner* — Ted M Wang
(74) *Attorney, Agent, or Firm* — Norton Rose Fulbright US LLP

(57) ABSTRACT

Beam management enhancements for advanced millimeter wave (mmWave) operations are disclosed. As a part of channel state information (CSI) reporting configuration, a user equipment may include an interference plus noise measurement of beams for consideration in beam management. The UE measures a set of signaling resources of each beam for power contribution and interference plus noise. According to the particular configuration, the UE may rank all of the available beams into a subset of the highest ranked beams, ranked either by the interference plus noise measurement, by the power contribution metric, or by a combination of both. The UE reports an identification of the subset to the serving base station which determines the beam to use for subsequent communications with the UE.

34 Claims, 7 Drawing Sheets

Related U.S. Application Data

(60) Provisional application No. 62/755,248, filed on Nov. 2, 2018.

(58) Field of Classification Search
USPC .......................................................... 375/267
See application file for complete search history.

(56) References Cited

U.S. PATENT DOCUMENTS

| | | |
|---|---|---|
| 2013/0223251 A1 | 8/2013 | Li et al. |
| 2014/0314007 A1 | 10/2014 | Chen et al. |
| 2017/0331670 A1 | 11/2017 | Parkvall et al. |
| 2017/0346534 A1 | 11/2017 | Islam et al. |
| 2019/0103908 A1 | 4/2019 | Yu et al. |
| 2019/0239245 A1* | 8/2019 | Davydov .............. H04L 5/0048 |
| 2020/0067590 A1* | 2/2020 | Wang ................... H04B 17/318 |
| 2020/0145068 A1 | 5/2020 | Chendamarai Kannan et al. |

FOREIGN PATENT DOCUMENTS

| | | |
|---|---|---|
| CN | 108288991 A | 7/2018 |
| CN | 108400803 A | 8/2018 |

OTHER PUBLICATIONS

NTT DOCOMO., et al., "Discussion on Multi-Beam Enhancement", 3GPP Draft, 3GPP TSG RAN WG1 Meeting #94bis, R1-1811349, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518752, 11 Pages, Retrieved from the Internet: URL: http://www.3gpp.org/ftp/tsg%5Fran/WG1%5FRL1/TSGR1%5F94b/Docs/R1%2D1811349%2Ezip [retrieved on Sep. 29, 2018], Section 5, pp. 7-8.
Partial International Search Report—PCT/US2019/059529—ISA/EPO—dated Jan. 29, 2020 (190356WO).

* cited by examiner

BEAM MANAGEMENT ENHANCEMENTS FOR MMWAVE OPERATIONS

CROSS-REFERENCE TO RELATED APPLICATIONS

This application is a Continuation of U.S. patent application Ser. No. 16/670,804, entitled, "BEAM MANAGEMENT ENHANCEMENTS FOR MMWAVE OPERATIONS," filed, Oct. 31, 2019, and claims the benefit of U.S. Provisional Patent Application No. 62/755,248, entitled, "BEAM MANAGEMENT ENHANCEMENTS FOR ADVANCED MMWAVE OPERATIONS," filed on Nov. 2, 2018, which is expressly incorporated by reference herein in its entirety.

BACKGROUND

Field

Aspects of the present disclosure relate generally to wireless communication systems, and more particularly, to beam management enhancements for millimeter wave (mm-Wave) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks (e.g., a Long Term Evolution (LTE) system, or a New Radio (NR) system), and Single-Carrier FDMA (SC-FDMA) networks. A wireless multiple-access communications system may include a number of base stations (e.g., a gNB, TRP, eNB) or other network access network nodes, each simultaneously supporting communication for multiple communication devices, which may be otherwise known as user equipment (UE).

In some wireless systems, base stations and UEs may communicate using directional transmissions (e.g., beams), where beamforming techniques may be applied using one or more antenna arrays to generate beams in different directions. For example, a base station may transmit downlink communications (e.g., synchronization signals, signals, data signals, etc.) to a UE using a transmit beam oriented in a particular direction, and the UE may in turn receive the downlink communications using a receive beam oriented in a direction opposite to the transmit beam. In very high frequency systems a base station may transmit using narrow beams to overcome path loss. A UE may be able to receive on many suitable downlink beams from one or more base stations. Searching and tracking a large number of beams increases complexity and consumes modem and RF power. It may thus be desirable to improve techniques for downlink beam selection in beamformed communication systems.

SUMMARY

In one aspect of the disclosure, a method of wireless communication includes receiving, at a user equipment (UE), a channel state information (CSI) reporting configuration message from a serving base station, wherein the CSI reporting configuration message identifies a set of CSI resources for reporting CSI on a plurality of beams by the UE, measuring, by the UE, an interference plus noise metric of a first signaling resource of each beam of the plurality of beams, measuring by the UE, a power contribution metric of a second signaling resource of each beam of the plurality of beams, ranking, by the UE, the plurality of beams based on a ranking parameter, wherein the ranking parameter includes one of: the interference plus noise metric, or the power contribution metric, selecting, by the UE, a subset of highest ranked beams according to the ranking, and transmitting, by the UE, identification of the subset of highest ranked beams to the serving base station via the set of CSI resources.

In an additional aspect of the disclosure, an apparatus configured for wireless communication includes means for receiving, at a UE, a CSI reporting configuration message from a serving base station, wherein the CSI reporting configuration message identifies a set of CSI resources for reporting CSI on a plurality of beams by the UE, means for measuring, by the UE, an interference plus noise metric of a first signaling resource of each beam of the plurality of beams, means for measuring by the UE, a power contribution metric of a second signaling resource of the each beam of the plurality of beams, means for ranking, by the UE, the plurality of beams based on a ranking parameter, wherein the ranking parameter includes one of: the interference plus noise metric, or the power contribution metric, means for selecting, by the UE, a subset of highest ranked beams according to results of the means for ranking, and means for transmitting, by the UE, identification of the subset of highest ranked beams to the serving base station via the set of CSI resources.

In an additional aspect of the disclosure, a non-transitory computer-readable medium having program code recorded thereon. The program code further includes code to receive, at a UE, a CSI reporting configuration message from a serving base station, wherein the CSI reporting configuration message identifies a set of CSI resources for reporting CSI on a plurality of beams by the UE, code to measure, by the UE, an interference plus noise metric of a first signaling resource of each beam of the plurality of beams, code to measure by the UE, a power contribution metric of a second signaling resource of each beam of the plurality of beams, code to rank, by the UE, the plurality of beams based on a ranking parameter, wherein the ranking parameter includes one of: the interference plus noise metric, or the power contribution metric, code to select, by the UE, a subset of highest ranked beams according to execution of the code to rank, and code to transmit, by the UE, identification of the subset of highest ranked beams to the serving base station via the set of CSI resources.

In an additional aspect of the disclosure, an apparatus configured for wireless communication is disclosed. The apparatus includes at least one processor, and a memory coupled to the processor. The processor is configured to receive, at a UE, a CSI reporting configuration message from a serving base station, wherein the CSI reporting configuration message identifies a set of CSI resources for reporting CSI on a plurality of beams by the UE, to measure, by the UE, an interference plus noise metric of a first signaling resource of each beam of the plurality of beams, to measure by the UE, a power contribution metric of a second signaling resource of each beam of the plurality of beams, to rank, by the UE, the plurality of beams based on a ranking parameter, wherein the ranking parameter includes one of: the interference plus noise metric, or the power contribution metric, to select, by the UE, a subset of highest ranked beams according to execution of the configuration of the at least one processor to rank, and to transmit, by the UE, identification of the subset of highest ranked beams to the serving base station via the set of CSI resources.

The foregoing has outlined rather broadly the features of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
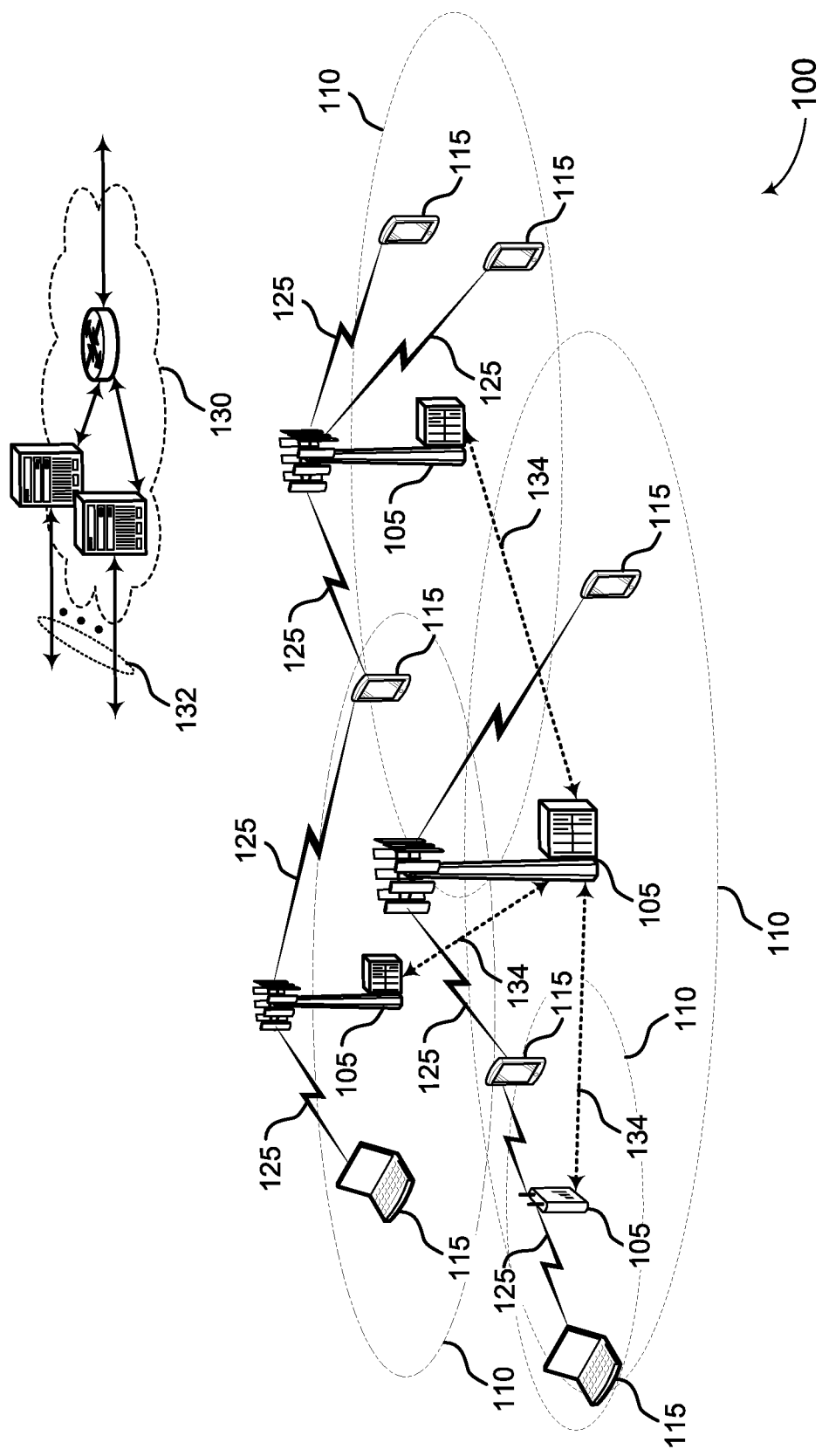
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Some wireless communication systems may support beamformed transmissions between a base station and a user equipment (UE). For example, some systems may operate in millimeter wave (mmW) frequency ranges, e.g., 28 GHz, 40 GHz, 60 GHz, etc. Wireless communication at these frequencies may be associated with signal attenuation (e.g., path loss) at a higher rate than wireless communications at lower frequency ranges, e.g., 7125 MHz or lower, which may be influenced by various factors, such as temperature, barometric pressure, diffraction, etc. As a result, signal processing techniques, such as beamforming, may be used to coherently combine energy and overcome path losses at these frequencies. A wireless device may use a number of antenna ports (e.g., 1, 2, 4, 8 antenna ports) associated with arrays of antennas to form beams oriented in various directions using a number of analog weight factors. For example, as a base station transmits downlink signals using directional beams, a UE may also utilize beamforming for the UE's own directional receive beams (and its uplink transmit beams for uplink transmissions to the base station).

A base station may transmit synchronization signal (SS) blocks, channel state information-reference signal (CSI-RS) or other downlink beam signals using downlink transmit beams each oriented in different directions. An SS block may be a combination of Primary Synchronization Signals (PSS), Secondary Synchronization Signals (SSS) and/or Primary Broadcast Channel Signals (PBCH). The PBCH may have Demodulation Reference Signals (DMRS) embedded in them. The transmit beams may, over time, cover the geographic coverage area of a cell allowing a UE inside the cell to synchronize with the downlink transmit beams.

A UE, in a cell with which the UE is currently communicating (a "serving cell"), may perform a beam training operation to determine synchronization signals associated with different downlink beams that can be received and decoded. The UE may consider these beams as candidates for a beam list that will be used for beam tracking purposes. The list may also contain a receive beam for receiving the downlink beams forming a beam pair. It can be appreciated that a UE may want a beam list with multiple beam pairs to track in case of a blocking event that would render one or more beam pairs unusable. It can also be appreciated that tracking multiple beams increases complexity, power usage, and modem complexity. Accordingly, it may be important to limit or proactively manage the number of beams on the beam list. The beam list may vary and result in different operating characteristics.

Moreover, beam training also increases complexity, power usage and mode complexity. Accordingly it may make sense to limit beam training events. In one aspect, a UE in a serving cell may limit beam training by limiting beam searches and performing a beam search only when the number of useful beams in the beam list falls below a threshold. The threshold may be determined by the UE and/or the base station based on a variety of factors.

In some aspects, the UE may put beams from multiple base station on its beam list providing rate and spatial diversity. In some aspects, serving cell beams on the beam list may be limited to a small number (e.g., 1 to 3 beams). These beams might be chosen, for example, to correspond to UE beams in different subarrays indicating correspondence to other clusters in the channel. In some aspects, the beam list may be generated based on UE distance to the base station transmitting the beam. The UE might, for example, favor beams that are a short distance to the base station with the number of beams from each base station being an inverse function of the distance. Various techniques, such as triangulation, may be used to estimate distances.

Beam lists may also be populated or refined using other criteria. For example, a UE may favor beams that allow for detection and reasonable demodulation performance with pseudo-omnidirectional (PO) beams allowing the UE to save power. In some aspects, UEs may also request that a base station use a coarser codebook reducing the UE power requirements and Adjacent Channel Leakage Ratio (ACLR) levels.

Aspects of the disclosure are initially described in the context of a wireless communications system. Examples are also provided which describe various transmit and receive beam configurations for which efficient transmit power control may be applied using one or more RACH beam transmission counters. Aspects of the disclosure are further illustrated by and described with reference to apparatus diagrams, system diagrams, and flowcharts that relate to uplink transmit power control during random access procedures.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low-latency communications, and communications with low-cost and low-complexity devices. Wireless communications system 100 may support the use of beam training procedures allowing UEs 115 to determine base station 105 beams that may be paired with one or more UE beams. UEs 115 may select some of these beam pairs for inclusion on a beam list.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a determined sequence or pattern (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an antenna beam in the direction of a target receiver (e.g., a UE 115). This may be achieved by configuring circuitry associated with elements of an antenna array to combine the signals transmitted by the elements in such a way that transmitted signals at particular angles relative to the antennas experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 115 may receive a master information block (MIB), which may be transmitted in a physical broadcast channel (PBCH) by the base station 105. The MIB may contain system bandwidth information, a system frame number (SFN), and a physical HARQ indicator channel (PHICH) configuration.

After decoding the MIB, the UE 115 may receive one or more system information blocks (SIBs). For example, SIB1 may contain cell access parameters and scheduling information for other SIBs. For instance, SIB1 access information, including cell identity information, and it may indicate whether a UE 115 is allowed to camp on a coverage area 110. SIB1 also includes cell selection information (or cell selection parameters) and scheduling information for other SIBs, such as SIB2. Decoding SIB1 may enable the UE 115 to receive SIB2, where SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring. Different SIBs may be defined according to the type of system information conveyed. In some cases, SIB2 may be scheduled dynamically according to information in SIB1, and includes access information and parameters related to common and shared channels.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance, and a temporary cell radio network temporary identifier (C-RNTI). The UE 115 may then transmit an RRC connection request along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115), the UE 115 may repeat the RACH process by transmitting a new RACH preamble.

Wireless devices in wireless communications system 100 may send transmissions in accordance with a certain link budget. The link budget may account for allowed signal attenuation between a UE 115 and a base station 105, as well as antenna gains at the UE 115 and base station 105. Accordingly, the link budget may provide, for example, a maximum transmit power for the various wireless devices within wireless communications system 100. In some cases, a UE 115 may coordinate transmit power with a serving base station 105 to mitigate interference, improve the uplink data rate, and prolong battery life.

Uplink power control may include a combination of open-loop and closed-loop mechanisms. In open-loop power control, the UE transmit power may depend on estimates of the downlink path-loss and channel configuration. In closed-loop power control, the network may directly control the UE transmit power using explicit power-control commands. Open-loop power control may be used for initial access, such as the transmission of a physical random access channel (PRACH) by a UE 115, whereas both open and closed loop control may be used for uplink control and data transmission. A UE 115 may determine power using an algorithm that takes into account a maximum transmission power limit, a target base station receive power, path loss, modulation and coding scheme (MCS), the number of resources used for transmission, and a format of the transmitted data (e.g., physical uplink control channel (PUCCH) format). Power adjustments may be made by a base station 105 using a transmit power command (TPC) messages, which may incrementally adjust the transmit power of a UE 115 as appropriate.

Figure 2:
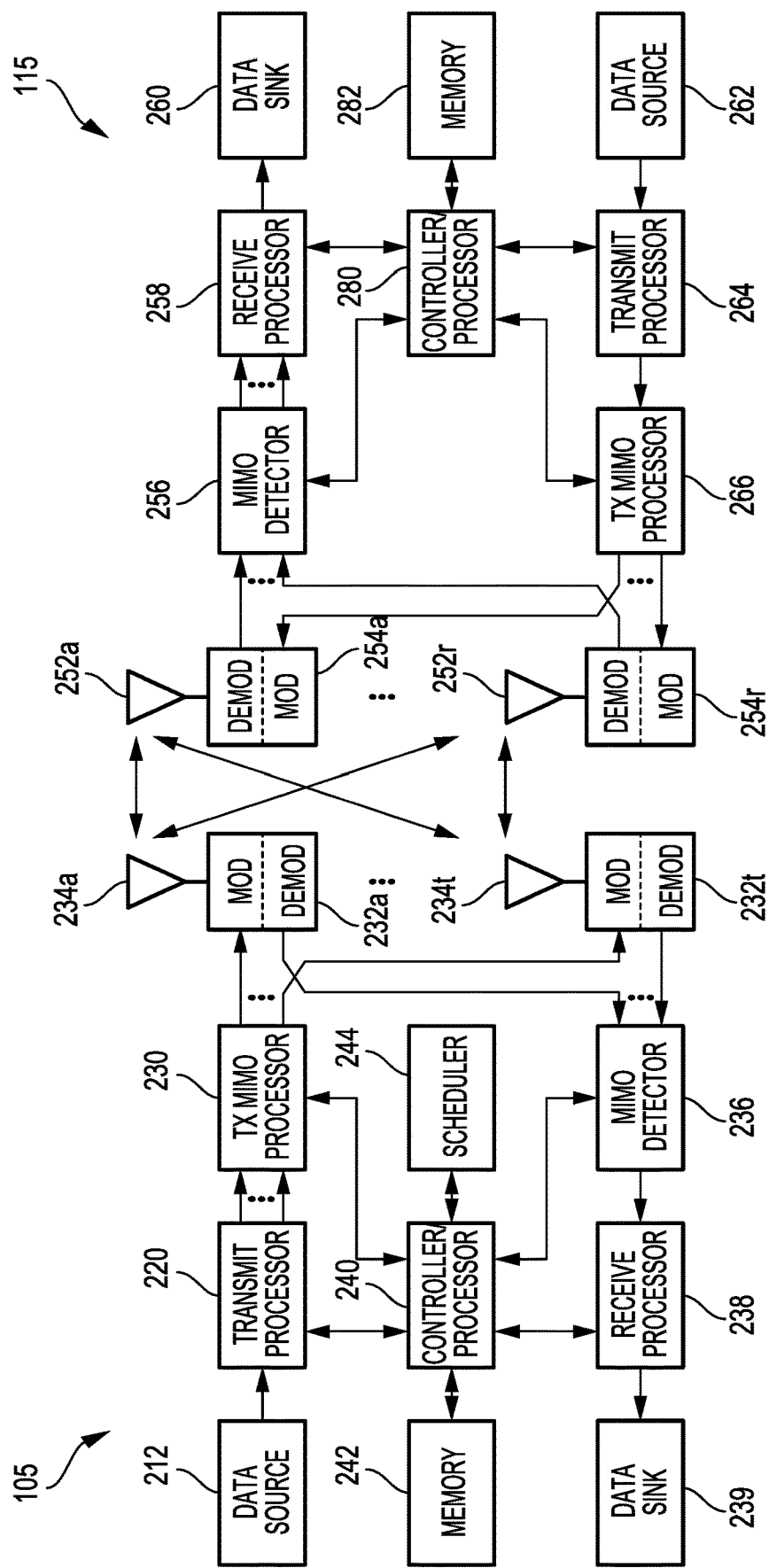
FIG. 2 is a block diagram illustrating a design of a base station and a UE configured according to one aspect of the present disclosure.

FIG. 2 shows a block diagram of a base station 105 and a UE 115, which may be one of the base stations 105 and one of the UEs 115 in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

Figure 3:
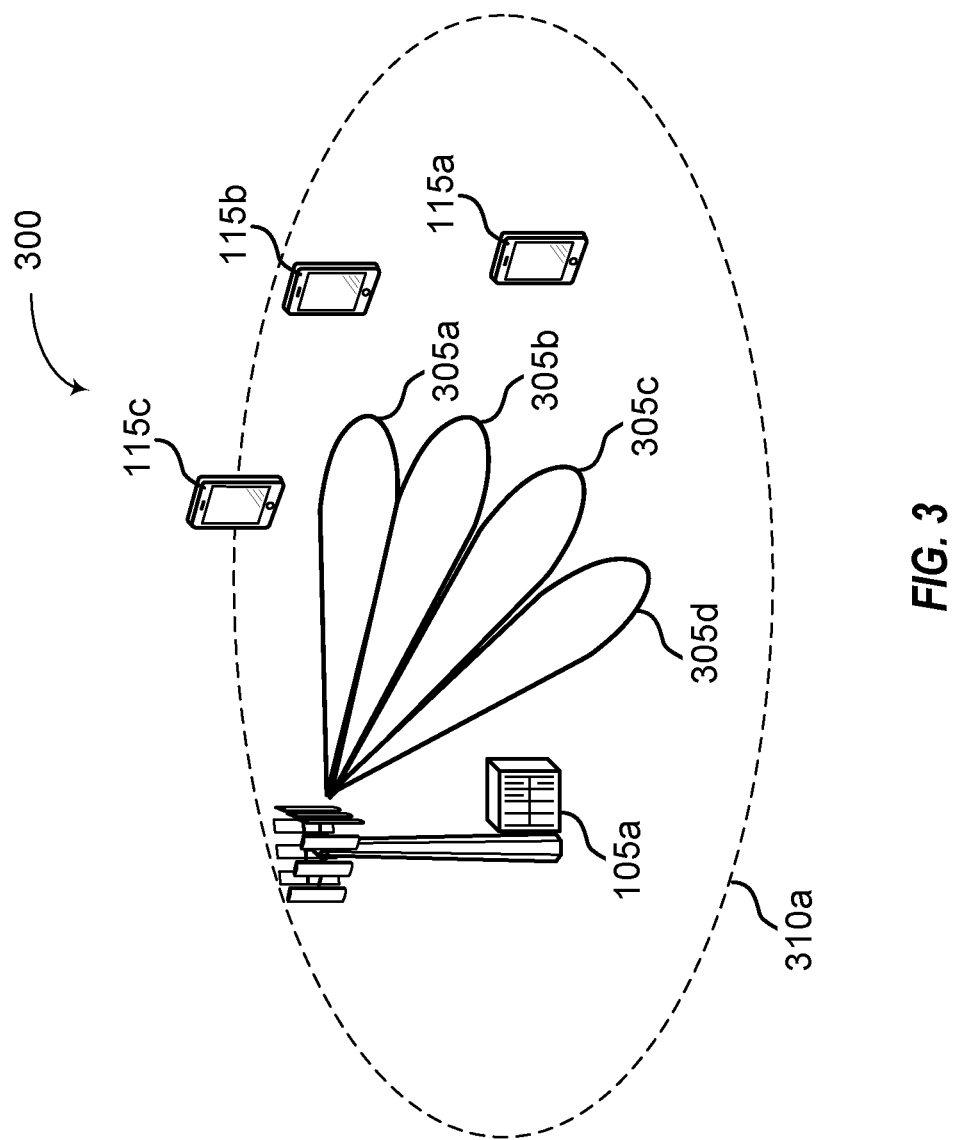
FIG. 3 illustrates an example of a wireless communications system that supports millimeter wave (mmW) beam selection.

FIG. 3 illustrates an example of a wireless communications system 300 that supports mmW beam management. In some examples, wireless communications system 300 may implement aspects of wireless communications system 100. For example, wireless communications system 300 may include a base station 105a and a UE 115a within coverage area 310a of base station 105a, which may be examples of the corresponding devices described with reference to FIGS. 1 and 2. When configured according to 3GPP Release 15, UE 115a may report channel state information (CSI) using different modes including channel quality indicator (CQI), precoding matrix indicator (PMI), CSI reference signal (CSI-RS) resource indicator (CRI), synchronization signal block resource indicator (SSBRI), layer indicator (LI), rank indicator (RI), layer 1 RSSP (L1-RSRP). Among these, base station 105a may use L1-RSRP as the metric for selecting the best beam(s) for communications. Wireless communications system 300 may support beam management based on a ranking of available beams according to L1-RSRP.

Beam management according to the described example provides for base station 105a to configure UE 115a with N CSI resources and prompts UE 115a to report the best K beams and their corresponding L1-RSRP. In one example of operation, base station 105a configures UE 115a to report the best two beams. UE 115a measures the L1-RSRP of a reference signal (e.g., SSB, CSI-RS, etc.) on each of beams 305a-d. Using the L1-RSRP measurements, UE 115a identifies beams 305a and 305b as the two beams having the highest L1-RSRP value. UE 115a then reports the subset of beams, beams 305a and 305b, along with the L1-RSRP measurements of beams 305a and 305b. Base station 105a receives the report and selects the beam or beams for further downlink transmissions. One issue with using L1-RSRP measurements to select beams is that the beam that yields the best L1-RSRP may not be the best choice in terms of signal to interference plus noise (SINR). Thus, high L1-RSRP beams, such as beams 305a and 305b may also experience a high degree of interference and noise (e.g., interference from UEs 115b and 115c). UE 115a may want to choose a beam which suffers less interference, even if it means not choosing the beam having the best L1-RSRP. Various aspects of the present disclosure relate to the addition of a L1-SINR CSI reporting node that is considered for beam management. The L1-SINR may also be computed based on SSB or other reference signal, such as CSI-RS.

Figure 4:
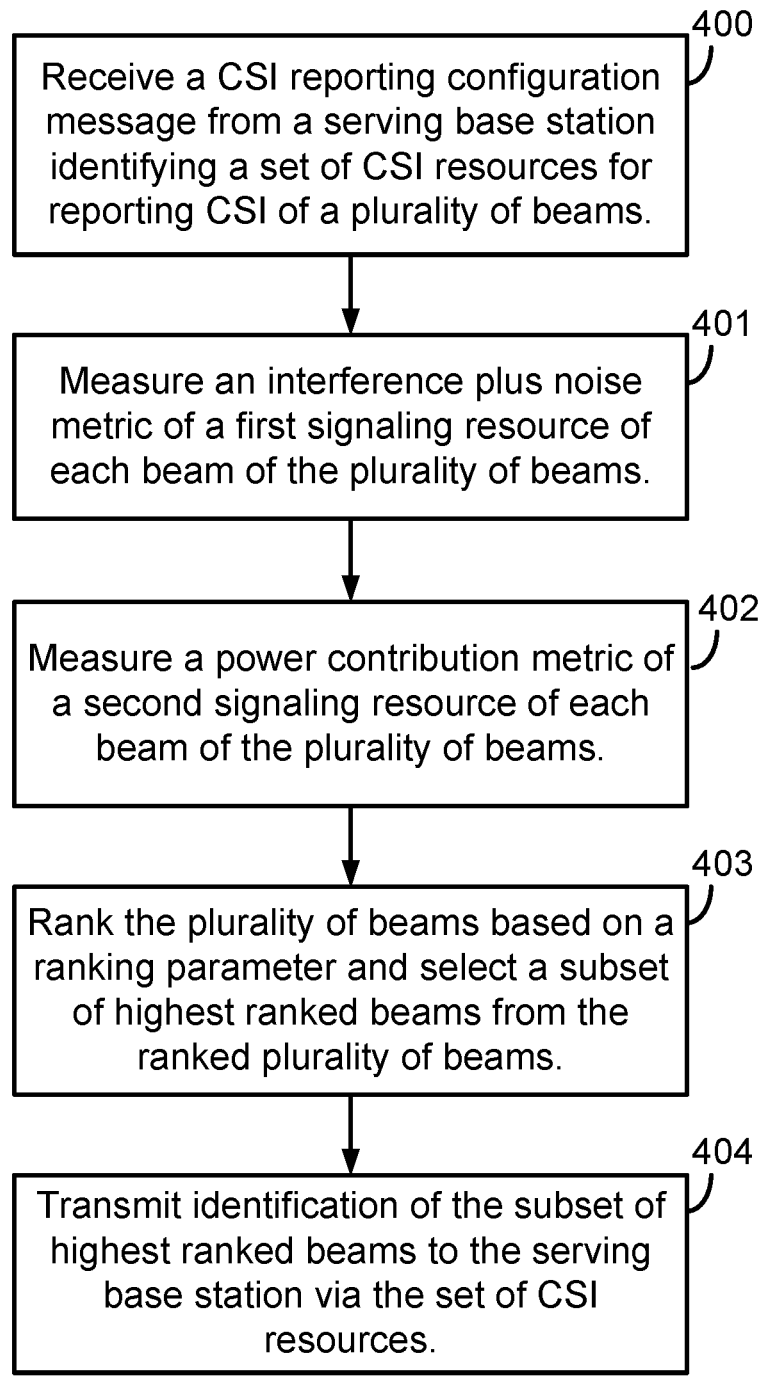
FIG. 4 is a block diagram illustrating example blocks executed to implement one aspect of the present disclosure.
Figure 7:
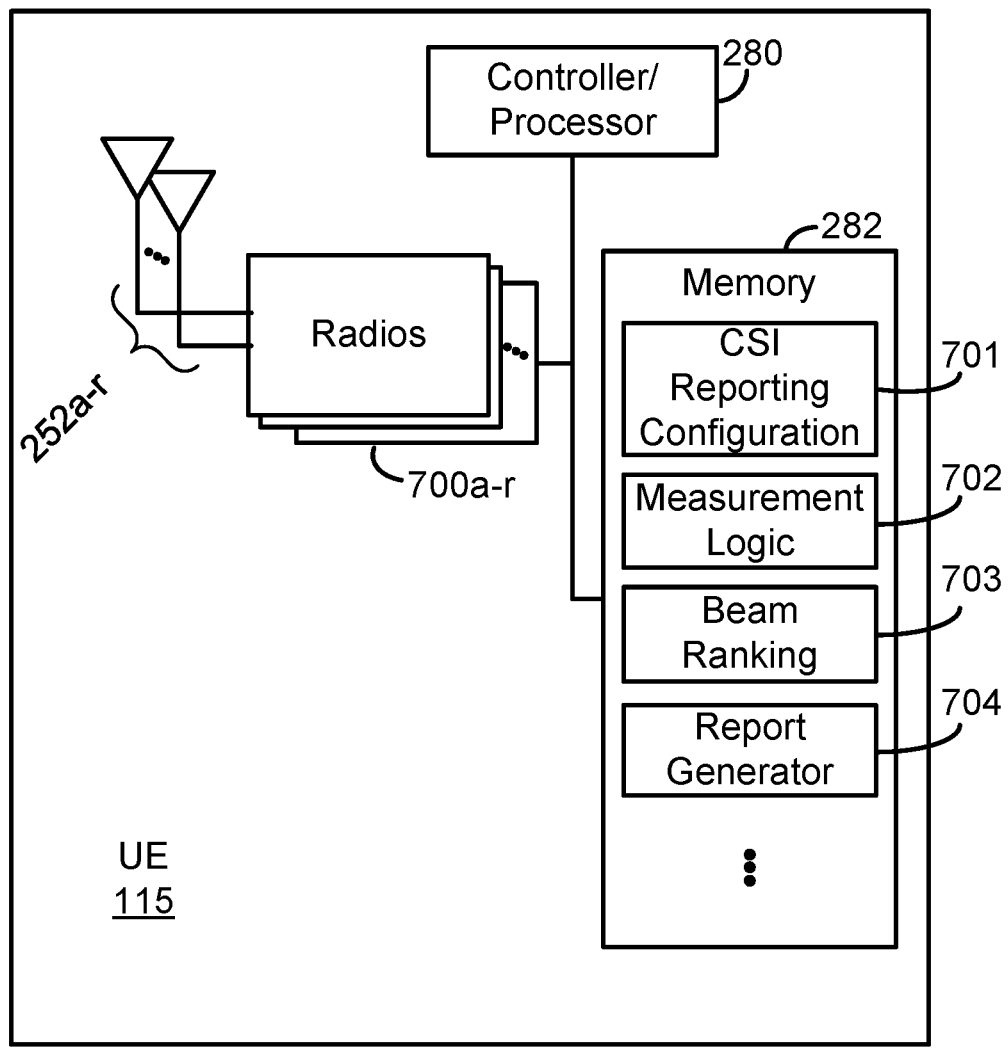
FIG. 7 is a block diagram illustrating an example UE configured according to aspects of the present disclosure.

FIG. 4 is a block diagram illustrating example blocks executed by a UE to implement one aspect of the present disclosure. The example blocks will also be described with respect to UE 115 as illustrated in FIG. 7. FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via radios 700a-r and antennas 252a-r. Radios 700a-r includes various components and hardware, as illustrated in FIG. 2 for UE 115, including modulator/demodulators 254a-r, MIMO detector 256, receive processor 258, transmit processor 264, and TX MIMO processor 266.

At block 400, the UE receives a CSI reporting configuration message from a serving base station, wherein the CSI reporting configuration message identifies a set of CSI resources for reporting CSI on a plurality of beams by the UE. A UE, such as UE 115, receives the CSI reporting configuration message from a serving base station via antennas 252a-r and wireless radios 700a-r. The reporting configuration information is stored in memory 282 in CSI reporting configuration 701. The reporting configuration identifies to UE 115 the type of beam management reporting mode that will be used by UE 115 in ranking and reporting the best available beams.

At block 401, the UE 115 measures an interference plus noise metric of a first signaling resource on each beam of the plurality of beams. In response to the configuration information received, UE 115, under control of controller/processor 280, executes measurement logic 701, stored in memory 282. The execution of measurement logic 701 provides the functionality for UE 115, under control of controller/processor 280 to measure the interference plus noise metric of the identified signaling resource (e.g., CSI-RS, SSB, etc.) in each of the beams available for communication.

At block 402, the UE measures a power contribution metric of a second signaling resource of each beam of the plurality of beams. The power contribution metric represents the average power of resource elements used to carry a reference signal. With the execution of measurement logic 702, UE 115 measures the power contribution on the second signaling resources to derive the power contribution metric. In various alternative example implementations, the second signaling resources may be the same resources UE 115 uses to measure the interference plus noise metric, or may be different resources, or different instances of the same signaling resources.

At block 403, the UE ranks the plurality of beams based on a ranking parameter, wherein the ranking parameter includes one of: the interference plus noise metric, or the power contribution metric, and selects a subset of highest ranked beams from the ranked plurality of beams. The beam management reporting mode identified in the configuration message, stored at CSI reporting configuration 701, prompts UE 115 to execute, under control of controller/processor 280, beam ranking logic 703, in memory 282. The execution of beam ranking logic 703 provides the functionality for UE 115 to rank the available beams. Beam ranking logic 703 may provide for ranking the beams according to the interference plus noise metric, according to the power contribution metric, or some combination of both. For example, the type of beam management reporting mode may provide for the beams to be ranked according to either the power contribution metric or the interference plus noise metric, while such beams are designated for reporting as one of the K best ranked beams provided that the other parameter (e.g., interference plus noise, where the ranking is performed based on power contribution, or power contribution, where the ranking is performed based on interference plus noise) meets a predetermined threshold level.

At block 404, the UE transmits identification of the subset of highest ranked beams to the serving base station via the set of CSI resources. As UE 115 identifies the highest ranked beams considered at least in part based on the interference plus noise metric associated with the beams, it executes, under control of controller/processor 280, report generator logic 704. The execution of report generator logic 704 provides the functionality for UE 115 to generate the reporting message that includes identification of the subset of highest ranked beams according to the beam management reporting mode, in addition to any measurements or metrics of the power contribution metric and/or interference plus noise metric.

Figure 5:
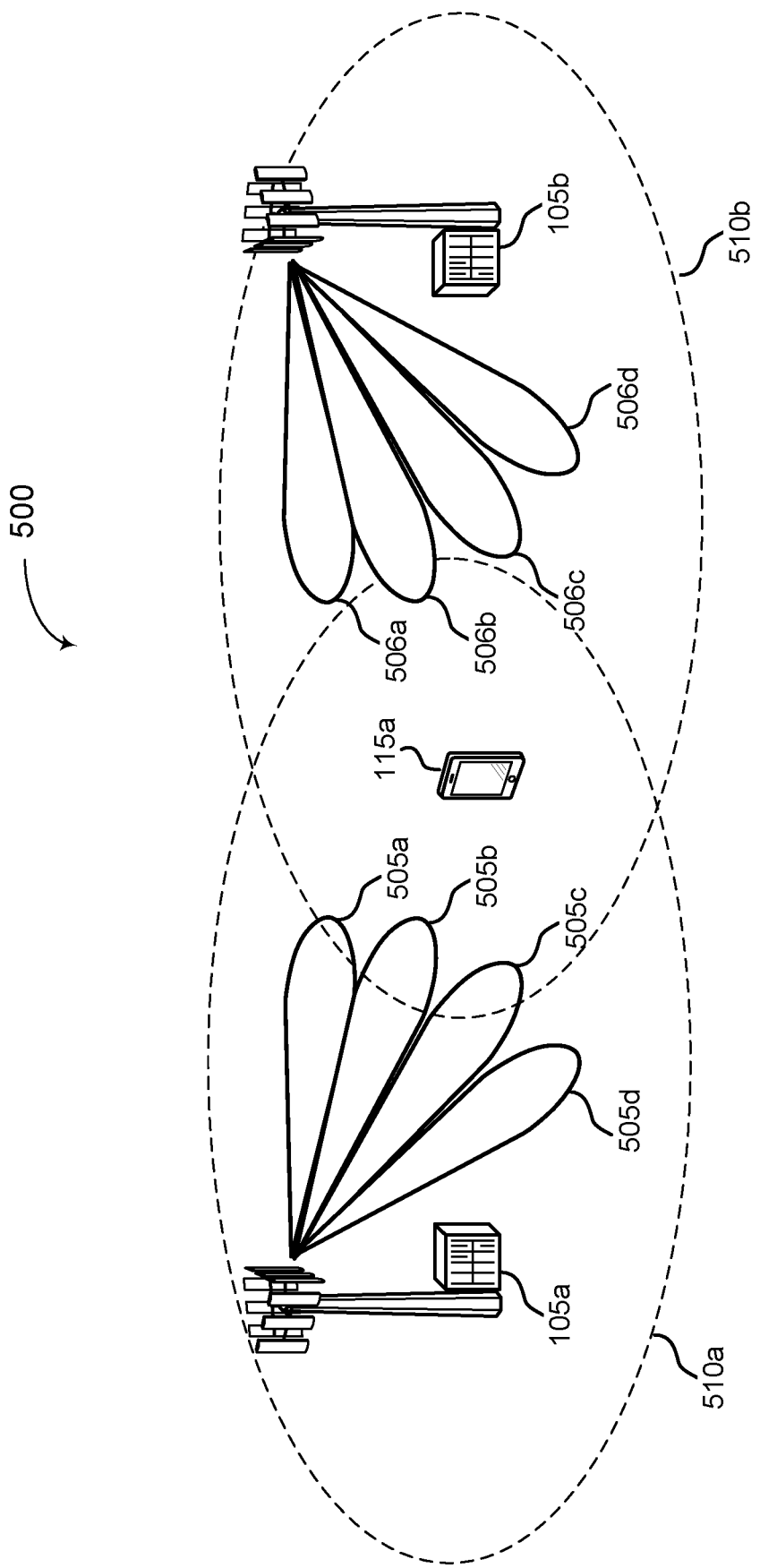
FIG. 5 is a block diagram illustrating a wireless network with a UE configured according to one aspect of the present disclosure.

FIG. 5 is a block diagram illustrating a wireless network 500 with UE 115a configured according to one aspect of the present disclosure. UE 115a is located with coverages areas 510a and 510b served by base stations 105a and 105b, respectively, and where the number of beams to report, K, is two. UE 115a receives configuration message from base station 105a that identifies a set of CSI resources along with an indication to report back the two best beams. According to aspects of the present disclosure, the configuration message may also include a CSI reporting mode for interference plus noise measurements to use in beam management.

In a first example aspect illustrated in FIG. 5, the interference plus noise reporting mode is separate from the power contribution reporting mode. Accordingly, UE 115a measures a signaling resource (e.g., CSI-RS, SSB) within each of beams 505a-d and beams 506a-d both for a power contribution (e.g., L1-RSRP) and for interference plus noise (e.g., L1-SINR). UE 115a determines that the two highest power contribution (e.g., L1-RSRP) measurements are from beams 505b and 506a, and determines that the two highest interference plus noise measurements are from beams 505c and 505a. According to the first example aspect, UE 115a reports to base station 105a an identification of beams 505b and 506a along with the corresponding measured power contribution from those beams. UE 115a also reports to base station 105a identification of beams 505c and 505a along with the corresponding measured interference plus noise metric. Base station 105a may then determine which of the beams to use for further downlink transmissions to UE 115. When beams from a neighboring base station, such as base station 105b, generate some of the top K beams, base station 105a may use those measurements to trigger a handover to base station 105b or may signal data for joint transmission or other coordinated transmissions (e.g., coordinated multi-point (CoMP) transmissions, carrier aggregation, or the like) to base station 105b.

According to a second example aspect illustrated in FIG. 5, the interference plus noise reporting mode includes conditional reporting based on supplemental measurements compared against a predetermined threshold value. For example, UE 115a measures both power contribution and interference plus noise on the signalling resources of each beam. In a first optional implementation, UE 115a sorts or ranks the top K beams according to power contribution. However, the beams with the highest power contribution metrics are not identified by UE 115a as one of the subset of highest ranked beams unless the interference plus noise metric for each such beam also exceeds a predetermined threshold. Thus, if beam 506a measures the highest value of power contribution out of all of beams 505a-d and 506a-d but has an interference plus noise metric that does not meet the predetermined threshold, UE 115a will not include beam 506a in the subset of highest-ranked beams reported to base station 105a.

In a second optional implementation, the opposite measurements are used, such that UE 115a sorts or ranks the top K beams according to their interference plus noise metric. UE 115a will only designate those beams having the highest interference plus noise metric for the subset of highest ranked beams to report if the power contribution metric of the designated beams also meets a predetermined power threshold.

It should be noted that the power contribution metric or interference plus noise metric compared to the threshold value may either be the actual measurement of the signalling resource or it may be a relational measurement. For example, when ranking according to power contribution, UE 115a ranks the beams from highest to lowest power contribution: beam 506a, 505a, 506b, 505b, 505c, 506c, 505d, 506d, while, from highest to lowest, the interference plus noise metrics are beam 506b, 505b, 505c, 506c, 506a, 505a, 505d, 506d. The top two beams are initially identified as beams 506a and beam 505a. However, in a first optional example, the interference plus noise metric of beam 506a falls below the predetermined threshold, thus, it is not included. In a second optional example, which uses a relational measurement, UE 115a would find the difference in interference plus noise metrics between beam 506a and the highest value of interference plus noise metric (beam 506b) and compare that value to a predetermined threshold. If the difference in interference plus noise metric between beams 506a and 506b is not significant, then it may meet the threshold, thus, UE 115a may include identification of beam 506a as one of the K highest ranked beams in its report to base station 105a.

In a third optional implementation, the CSI configuration message may indicate which measurement to use as the ranking parameter. Base station 105a may indicate for UE 115a to rank the beams according to the power contribution metric or the interference plus noise metric. Thus, with reference to the rankings identified above, where base station 105a configures UE 115a to rank according to power contribution metric, UE 115a would report identification of beams 506a and 505a, while, where base station 105a configures UE 115a to rank according to interference plus noise metric, UE 115a would report identification of beams 506b and 505b. With either ranking parameter, UE 115a would also send both the power contribution metric and interference plus power metric for the reported two beams. Base station 105a may then consider both power contribution and interference when determining the beam or beams to select for transmissions to UE 115a.

As noted above, SINR measurements are not defined for use in beam management of mmW operations in 3GPP Rel-15. Thus, according to the Rel-15 standards, the E-UTRA reference signal-signal to noise and interference ratio (E-UTRA RS-SINR) is defined as the linear average over the power contribution of the resource elements carrying cell-specific reference signals divided by the linear average of the noise and interference power contribution over the resource elements carrying cell-specific reference signals within the same frequency bandwidth. When used for beam management, according to the various aspects of the present disclosure, the definition for L1-SINR measurement may be modified.

In a first optional aspect, UE 115a may measure the power contribution on the given signalling resource (e.g., CSI-RS or SSB), but may average the interference plus noise metric over multiple instances of the signalling resources within the same transmission configuration indicator (TCI) state for the interference plus noise computation. The averaging over the multiple instances provides a combined look at the interference that arises over period of the TCI state.

In a second optional aspect, UE 115a may measure the power contribution on the given signalling resource, but will select either the maximum or minimum interference plus noise measurement over the multiple instances of the signalling resources within the same TCI state for the interference plus noise computation. In a third optional aspect, UE 115a may measure the power contribution and the interference plus noise metric over the same signalling resource.

Figure 6:
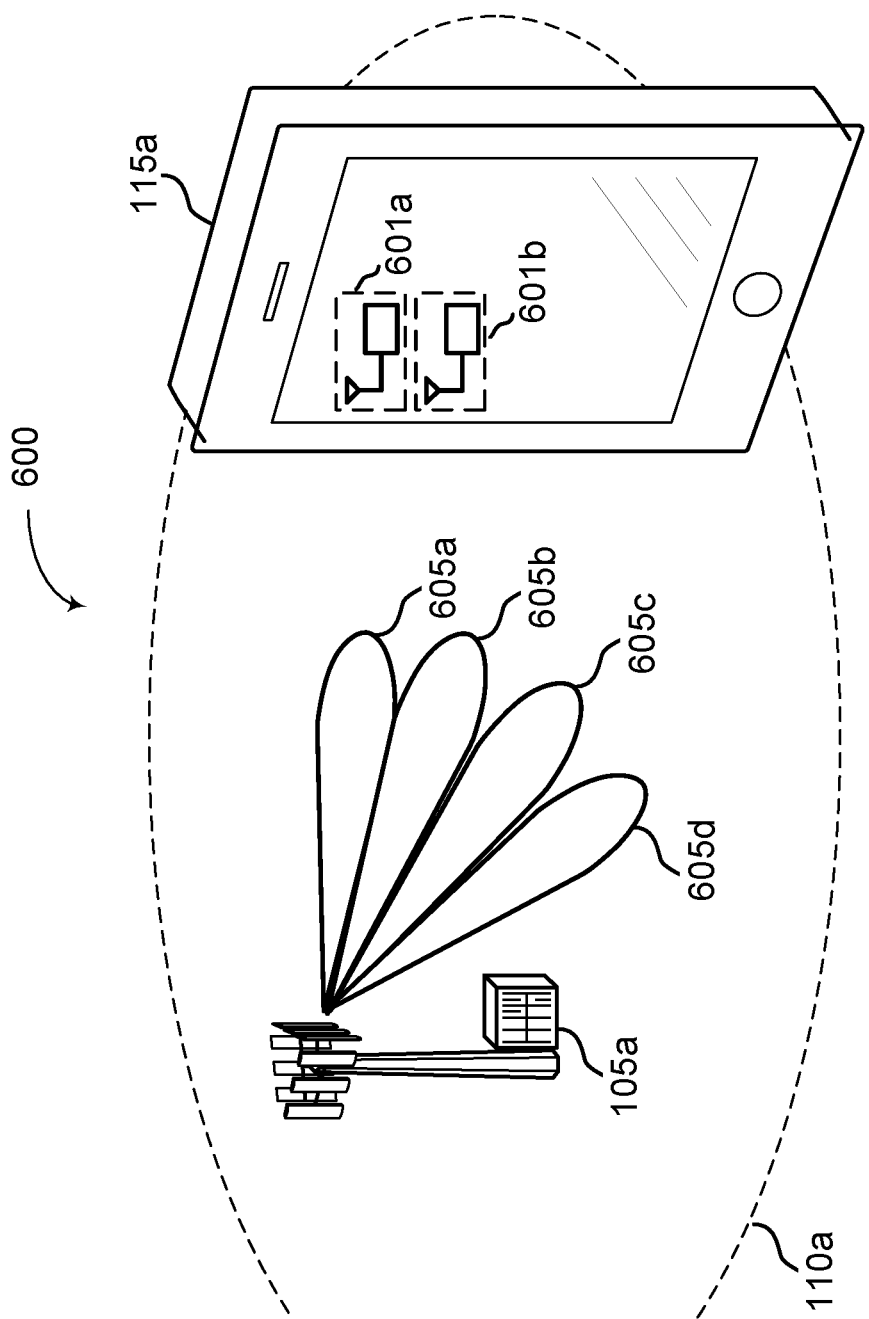
FIG. 6 is a block diagram illustrating a wireless network with a UE configured according to one aspect of the present disclosure.

FIG. 6 is a block diagram illustrating wireless communication network 600 with UE 115a configured according to one aspect of the present disclosure. As illustrated in FIG. 6, UE 115a is configured with multiple receiver chains 601a and 601b operable in combination for receiver diversity. Each of receiver chain 601a and 601b includes an antenna and a set of signal processing components for processing the signals received via the antenna and may provide diversity branches for signals received from base station 105a. Under the Rel-15 definition of interference plus noise measurement, when receiver diversity is in use by a UE, such as UE 115a, the reported value shall not be lower than the corresponding E-UTRA RS-SINR of any of the individual diversity branches of receiver chains 601a and 601b.

According to the illustrated aspect of FIG. 6, the definition may be modified in consideration of the interference plus noise metric being considered for beam management. In a first optional aspect, UE 115a calculates the interference plus noise metric as the average of the SINR of the individual diversity branches, receiver chains 601a and 601b. In a second optional aspect, UE 115a would calculate the interference plus noise metric as the minimum or maximum of the SINR of the individual diversity branches, receiver chains 601a and 601b. Selection of the minimum of the SINR measurements would be equivalent to the defined limitations discussed with respect to the Rel-15 definition. In a third optional aspect, UE 115a would determine an effective interference plus noise metric, calculated as the SINR corresponding to the sum-capacity over individual diversity branches, receiver chains 601a and 601b.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    receiving, at a user equipment (UE), a channel state information (CSI) reporting configuration message from a serving base station, wherein the CSI reporting configuration message identifies:
        a set of CSI resources for reporting CSI of a plurality of beams by the UE; and
        a beam management reporting mode for ranking beams and reporting ranked beams;
    measuring, by the UE, an interference plus noise metric of a first signaling resource of each beam of the plurality of beams;
    measuring by the UE, a power contribution metric of a second signaling resource of the each beam of the plurality of beams;
    ranking, by the UE, the plurality of beams based on the beam management reporting mode;
    selecting, by the UE, a subset of highest ranked beams from the plurality of beams according to the ranking; and
    transmitting, by the UE, identification of the subset of highest ranked beams to the serving base station via the set of CSI resources.

2. The method of claim 1, wherein the ranking includes ranking the plurality of beams based on the interference plus noise metric.

3. The method of claim 2, further including:
    selecting, by the UE, a second subset of beams from the plurality of beams based on the power contribution metric; and
    transmitting, by the UE, a second identification of the second subset of beams to the serving base station.

4. The method of claim 2, wherein:
    the selecting of the subset of highest ranked beams comprises selecting beams from among the plurality of beams such that each of the selected beams has a respective power contribution metric that exceeds a predetermined power contribution threshold.

5. The method of claim 1, wherein:
    the selecting of the subset of highest ranked beams comprises selecting beams from among the ranked plurality of beams such that each of the selected beams has a respective interference plus noise metric that exceeds a predetermined interference plus noise threshold.

6. The method of claim 1, wherein the transmitting further includes:
    transmitting the interference plus noise metric and the power contribution metric for each beam of the subset of highest ranked beams.

7. The method of claim 1, wherein the measuring the first signaling resource includes:
    measuring a plurality of instances of the first signaling resource within a same transmission configuration indicator (TCI) state; and
    one of:
        averaging a plurality of interference plus noise measurements of the plurality of instances of the first signaling resource for the interference plus noise metric; or
        selecting a maximum interference plus noise measurement of the plurality of instances of the first signaling resource for the interference plus noise metric; or
        selecting a minimum interference plus noise measurement of the plurality of instances of the first signaling resource for the interference plus noise metric.

8. The method of claim 1, wherein the first signaling resource is a same resource as the second signaling resource.

9. The method of claim 1,
    wherein the receiving occurs over a plurality of receiver diversity branches at the UE,
    wherein the measuring of the interference plus noise metric includes one of:
        calculating an average interference plus noise metric of interference plus noise measurements of each of the plurality of receiver diversity branches, wherein the average interference plus noise metric corresponds to the interference plus noise metric;
        identifying a minimum interference plus noise metric of the plurality of receiver diversity branches, wherein the minimum interference plus noise metric corresponds to the interference plus noise metric;
        identifying a maximum interference plus noise metric of the plurality of receiver diversity branches, wherein the maximum interference plus noise metric corresponds to the interference plus noise metric; or
        calculating an effective interference plus noise metric based on a sum-capacity measurement of interference plus noise over the plurality of receiver diversity branches, wherein the effective interference plus noise metric corresponds to the interference plus noise metric.

10. The method of claim 1, wherein the CSI reporting configuration message specifies a quantity of beams for the UE to report in the subset of highest ranking beams.

11. The method of claim 1, wherein receiving, at the UE, the CSI reporting configuration message includes receiving the CSI reporting configuration message at the UE using a plurality of receiver diversity branches.

12. An apparatus configured for wireless communication, the apparatus comprising:
    at least one processor; and
    a memory coupled to the at least one processor,
    wherein the at least one processor is configured to:
        receive, at a user equipment (UE), a channel state information (CSI) reporting configuration message from a serving base station, wherein the CSI reporting configuration message identifies:
            a set of CSI resources for reporting CSI of a plurality of beams by the UE; and
            a beam management reporting mode for ranking beams and reporting ranked beams;
        measure, by the UE, an interference plus noise metric of a first signaling resource of each beam of the plurality of beams;
        measure by the UE, a power contribution metric of a second signaling resource of the each beam of the plurality of beams;
        rank, by the UE, the plurality of beams based on the beam management reporting mode;
        select, by the UE, a subset of highest ranked beams from the plurality of beams according to execution of a configuration of the at least one processor to rank; and
        transmit, by the UE, identification of the subset of highest ranked beams to the serving base station via the set of CSI resources.

13. The apparatus of claim 12, wherein the configuration of the at least one processor to rank includes configuration to rank the plurality of beams based on the interference plus noise metric.

14. The apparatus of claim 13, further including configuration of the at least one processor to:
    select, by the UE, a second subset of beams from the plurality of beams based on the power contribution metric; and
    transmit, by the UE, a second identification of the second subset of beams to the serving base station.

15. The apparatus of claim 13, wherein the configuration of the at least one processor to select of the subset of highest ranked beams comprises configuration of the at least one processor to select beams from among the plurality of beams such that each of the selected beams has a respective power contribution metric that exceeds a predetermined power contribution threshold.

16. The apparatus of claim 12, wherein the configuration of the at least one processor to rank includes configuration of the at least one processor to:
    rank the plurality of beams based on the power contribution metric;
    compare the interference plus noise metric of each beam of the plurality of beams against a predetermined interference plus noise threshold; and
    select the subset of beams according to the interference plus noise metric of the each beam exceeding the predetermined interference plus noise threshold.

17. The apparatus of claim 12, wherein the configuration of the at least one processor to transmit further includes configuration to transmit the interference plus noise metric and the power contribution metric for each beam of the subset of highest ranked beams.

18. The apparatus of claim 12, wherein the configuration of the at least one processor to measure the first signaling resource includes configuration of the at least one processor:
    to measure a plurality of instances of the first signaling resource within a same transmission configuration indicator (TCI) state; and
    configuration of the at least one processor to one of:
        average a plurality of interference plus noise measurements of the plurality of instances of the first signaling resource for the interference plus noise metric; or
        select a maximum interference plus noise measurement of the plurality of instances of the first signaling resource for the interference plus noise metric; or
        select a minimum interference plus noise measurement of the plurality of instances of the first signaling resource for the interference plus noise metric.

19. The apparatus of claim 12, wherein the first signaling resource is a same resource as the second signaling resource.

20. The apparatus of claim 12,
wherein the configuration of the at least one processor to receive occurs over a plurality of receiver diversity branches at the UE,
wherein the configuration of the at least one processor to measure the interference plus noise metric includes configuration of the at least one processor to one of:
calculate an average interference plus noise metric of interference plus noise measurements of each of the plurality of receiver diversity branches, wherein the average interference plus noise metric corresponds to the interference plus noise metric;
identify a minimum interference plus noise metric of the plurality of receiver diversity branches, wherein the minimum interference plus noise metric corresponds to the interference plus noise metric;
identify a maximum interference plus noise metric of the plurality of receiver diversity branches, wherein the maximum interference plus noise metric corresponds to the interference plus noise metric; or
calculate an effective interference plus noise metric based on a sum-capacity measurement of interference plus noise over the plurality of receiver diversity branches, wherein the effective interference plus noise metric corresponds to the interference plus noise metric.

21. The apparatus of claim 12, wherein the CSI reporting configuration message specifies a quantity of beams for the UE to report in the subset of highest ranking beams.

22. The apparatus of claim 12, wherein the configuration of the at least one processor to receive the CSI reporting configuration message includes configuration of the at least one processor to receive the CSI reporting configuration message at the UE using a plurality of receiver diversity branches.

23. A method of wireless communication, comprising:
transmitting, by a base station (BS) to a user equipment (UE), a channel state information (CSI) reporting configuration message identifying:
a set of CSI resources for reporting CSI of a plurality of beams; and
a beam management reporting mode for ranking beams and reporting ranked beams, the beam management reporting mode provides for ranking the plurality of beams using an interference plus noise metric, or a power contribution metric, or a combination thereof;
receiving, at the BS via the set of CSI resources, an identification of a subset of highest ranked beams from the plurality of beams, the subset of highest ranked beams ranked is based on one or more of:
the interference plus noise metric of a first signaling resource of each beam of the plurality of beams;
the power contribution metric of a second signaling resource of the each beam of the plurality of beams.

24. The method of claim 23, wherein ranking of the highest ranked beams is based on the interference plus noise metric.

25. The method of claim 23, wherein ranking of the highest ranked beams is based on the power contribution metric.

26. The method of claim 23, wherein the receiving further includes:

receiving the interference plus noise metric and the power contribution metric for each beam of the subset of highest ranked beams.

27. The method of claim 23, wherein the subset of highest ranked beams are selected from among the plurality of beams such that each of the subset of highest ranked beams has a respective interference plus noise metric that exceeds a predetermined interference plus noise threshold.

28. The method of claim 23, wherein transmitting the CSI reporting configuration message to the UE causes the UE to receive the CSI reporting configuration message using a plurality of receiver diversity branches.

29. An apparatus configured for wireless communication, the apparatus comprising:
at least one processor; and
a memory coupled to the at least one processor,
wherein the at least one processor is configured to:
transmit, by a base station (BS) to a user equipment (UE), a channel state information (CSI) reporting configuration message identifying:
a set of CSI resources for reporting CSI of a plurality of beams; and
a beam management reporting mode for ranking beams and reporting ranked beams, the beam management reporting mode provides for ranking the plurality of beams using an interference plus noise metric, or a power contribution metric, or a combination thereof;
receive, at the BS via the set of CSI resources, an identification of a subset of highest ranked beams from the plurality of beams, the subset of highest ranked beams ranked is based on one or more of:
the interference plus noise metric of a first signaling resource of each beam of the plurality of beams;
the power contribution metric of a second signaling resource of the each beam of the plurality of beams.

30. The apparatus of claim 29, wherein ranking of the highest ranked beams is based on the interference plus noise metric.

31. The apparatus of claim 29, wherein ranking of the highest ranked beams is based on the power contribution metric.

32. The apparatus of claim 29, wherein the configuration of the at least one processor to receive includes configuration to receive the interference plus noise metric and the power contribution metric for each beam of the subset of highest ranked beams.

33. The apparatus of claim 29, wherein the subset of highest ranked beams are selected from among the plurality of beams such that each of the subset of highest ranked beams has a respective interference plus noise metric that exceeds a predetermined interference plus noise threshold.

34. The apparatus of claim 29, wherein the configuration of the at least one processor to transmit the CSI reporting configuration message to the UE causes the UE to receive the CSI reporting configuration message using a plurality of receiver diversity branches.

* * * * *